United States Patent
Umetsu

(10) Patent No.: US 7,035,121 B2
(45) Date of Patent: Apr. 25, 2006

(54) SWITCHING POWER SUPPLY APPARATUS

(75) Inventor: Koji Umetsu, Miyagi (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 10/512,993

(22) PCT Filed: Mar. 3, 2004

(86) PCT No.: PCT/JP2004/002653
§ 371 (c)(1),
(2), (4) Date: Oct. 29, 2004

(87) PCT Pub. No.: WO2004/088829
PCT Pub. Date: Oct. 14, 2004

(65) Prior Publication Data
US 2005/0162874 A1    Jul. 28, 2005

(30) Foreign Application Priority Data
Mar. 28, 2003    (JP) .............................. 2003-092527

(51) Int. Cl.
H02M 3/335    (2006.01)
(52) U.S. Cl. ................. 363/21.11; 363/21.08
(58) Field of Classification Search ............. 363/21.11, 363/21.08, 21.04
See application file for complete search history.

(56) References Cited

U.S. PATENT DOCUMENTS

| 4,754,386 A | * | 6/1988 | De Weerd ................ 363/21.08 |
| 6,456,510 B1 | * | 9/2002 | Patel et al. ............. 363/21.06 |

FOREIGN PATENT DOCUMENTS

| EP | 0 749 199 A1 | 12/1996 |
| JP | 11-224132 A | 8/1999 |
| JP | 2001-224166 A | 8/2001 |
| JP | 2004-112992 A | 4/2004 |

OTHER PUBLICATIONS

International Search Report Jun. 8, 2004.

* cited by examiner

Primary Examiner—Shawn Riley
(74) Attorney, Agent, or Firm—Rader, Fishman, & Grauer PLLC; Ronald P. Kananen

(57) ABSTRACT

An AC power supply supplied from an outlet 11 is rectified by a rectifying circuit 13 through an input filter 12. The rectified power is supplied to a primary winding N1 of a transformer 14. A controlling circuit 19 has a switching device Q1 that controls on/off at predetermined timing. An FB signal that represents a power state of a load circuit 15 is supplied to the controlling circuit 19 through a transistor Q2. A comparator 20 compares a rectified voltage V3 of a tertiary winding of the transformer with a reference voltage REF3 and outputs an error signal. With the error signal, the transistor Q2 is controlled. Thus, the voltage for the controlling circuit supplied from the tertiary winding can be prevented from lowering against abrupt load variation. In addition, the output voltage Vo can be prevented from largely varying.

3 Claims, 10 Drawing Sheets

SWITCHING POWER SUPPLY APPARATUS

TECHNICAL FIELD

The present invention relates to a switching power supply apparatus for turning on and off a DC power supply with for example a switching device, obtaining an AC signal, rectifying and smoothening the AC signal, and obtaining any DC power.

BACKGROUND ART

In recent years, a switching device that withstands relatively high frequency current and voltage have been developed. A switching power supply apparatus having such a switching device that can relatively easily convert a commercial power supply into a DC power has become widespread.

FIG. 1 is a block diagram showing an example of such a switching power supply.

In FIG. 1, reference numeral 11 represents a connector that is connected to a commercial power supply. Reference numeral 12 represents an input filter that removes noise that the switching power supply generates. Reference numeral 13 represents a rectifying circuit that has a rectifying diode that rectifies an AC power supply into a DC voltage (Vin).

Reference numeral 14 represents a transformer (T1) that has a primary winding N1, a secondary winding N2, and a tertiary winding N3. Reference numeral 15 represents a load circuit (unit or apparatus). An AC power is induced in the secondary winding of the transformer (T1) 14. A rectifying diode D3 and a smoothening capacitor C2 convert the AC power into a DC output voltage (Vo). The voltage (Vo) is supplied to the transformer (T1) 14.

The load circuit 15 has a secondary battery cell. When the load circuit is in an operation stop state, the load circuit charges the secondary battery cell. In contrast, when the load circuit is in an operation state, the secondary battery cell supplies a required power to the load circuit. The load circuit is for example a digital camera, a video camera, a small TV, or the like.

Reference numerals 16 and 17 represent operational amplifiers (OP1) and (OP2) that detect an output voltage (Vo) and an output current (Io), respectively. Reference numeral 18 represents a photo coupler (PH1) that has a photo diode and a photo transistor into which detection signals of the operational amplifiers 16 and 17 are input through diodes D1 and D2. Outputs of the operational amplifiers (OP1) and (OP2) become a signal for detecting means that detects a load power. The signal is supplied from the photo diode to the photo transistor of the photo coupler (PH1) and then to an FB terminal of a controlling circuit 19 as a control signal that turns on and off a transistor Q1 as a switching device.

The switching device Q1 can be composed of an MOS FET.

A power induced in the tertiary winding N3 is supplied to the controlling circuit 19 through a rectifying circuit. The controlling circuit 19 is normally composed of an IC circuit. The rectifying circuit is composed of a diode D4 and a smoothening capacitor C1.

Next, the operation of the foregoing switching power supply will be described.

The AC power supply is rectified and a DC voltage (Vin) is obtained. The DC voltage (Vin) is applied to a starting resistor Rp. As a result, a weak current is supplied to the controlling IC circuit through the starting resistor Rp. When a voltage (Vcc) of the controlling circuit 19 rises to an operation region of the controlling circuit 19, it outputs drive pulses at an oscillation frequency of for example 100 kHz. The drive pulses cause the switching device Q1 to turn on and off a current that flows in the primary winding N1 of the transformer (T1) 14.

In this example, it is assumed that the power supply is a fly-back type power supply. When the switching device Q1 is turned on, electromagnetic energy is stored in the primary winding N1. When the switching device Q1 is turned off, the electromagnetic energy stored in the primary winding N1 induce powers in the secondary winding (N2) and the tertiary winding (N3) of the transformer (T1) 14.

The output voltage of the foregoing switching power supply is controlled as follows. The voltage induced in the secondary winding (N2) is rectified by the diode D3 and the smoothening capacitor C2. The output voltage (Vo) is input to a minus terminal of the operational amplifier (OP1) 16. In addition, a reference voltage REF1 is input to a plus terminal of the operational amplifier (OP1) 16. The operational amplifier (OP1) 16 compares the voltage Vo with the reference voltage REF1 and outputs an error signal. The error signal is supplied to the photo coupler (PH1) 18 through the diode D1.

The error signal of the voltage is transferred from a secondary side to a primary side of the photo coupler (PH1) 18. The controlling circuit 19 has a pulse width modulating (PWM) circuit that controls the ON period of the switching device Q1 disposed on the primary side of the transformer (T1) 14 so as to control the power on the secondary side.

As a result, with the reference voltage REF1 of the operational amplifier (OP1) 16 as the reference voltage on the secondary side, the output voltage is controlled.

On the other hand, an output current (Io) that flows to the load circuit 15 flows in a resistor R1 that has a low resistance. The current that flows in the resistor R1 is converted into a voltage. The voltage is applied to a plus terminal of the operational amplifier (OP2) 17 through a reference voltage REF2.

A minus terminal of the operational amplifier (OP2) 17 is connected to the other terminal of the R1 terminal through the reference voltage REF2. The operational amplifier (OP2) 17 compares the current amount of the reference voltage REF2 with the current that flows in the resistor R1.

The operational amplifier (OP2) 17 compares the current amount corresponding to the reference voltage REF2 with the current amount that flows in the resistor R1 and outputs an error signal. The error signal is input to the photo coupler (PH1) 18 through the diode D2. Like the case that the voltage is controlled, the controlling circuit (IC circuit) 19 on the primary side controls the on/off rate of the switching device Q1 so that the output current Io becomes a predetermined current amount corresponding to the reference voltage REF2.

As described above, the operational amplifier (OP1) 16 controls the output voltage Vo for a predetermined voltage and the operational amplifier (OP2) 17 controls the output current Io for a predetermined current. The operational amplifier (OP1) 16 and the operational amplifier (OP2) 17 compose detecting means.

Next, based on the foregoing operations, the non-load operation of which the output current (Io) does not flow in the load circuit 15 will be described.

When the load current (Io) flows, the controlling circuit 19 (PWM IC controlling circuit) control a repetitive oscillation at a predetermined basic oscillation frequency for example 100 kHz. The controlling circuit 19 controls the ON period of the switching device Q1 corresponding to the load power in accordance with the PWM.

On the other hand, in the non-load state, the controlling circuit 19 controls an oscillation at a low frequency in the minimum pulse period as will be described later. FIG. 2 shows waveforms of the base and collector of the switching device Q1 at those timings.

When the load current flows, the waveform of the base of the switching device Q1 oscillates at f1 (for example, 100 kHz). However, in the non-load state of which the pulse width becomes the minimum, the oscillation frequency lowers. The waveform of the base of the switching device Q1 oscillates at f2 (for example, 20 kHz). In other words, in the non-load state, drive powers for the operational amplifiers 16 and 17, the photo coupler 18, and the controlling circuit 19 are required. In other words, the ON period of the switching device Q1 is fixed and the OFF period thereof is varied so that the output voltage is controlled for a predetermined voltage. As a result, the OFF period of the switching device Q1 is varied so as to lower the oscillation frequency.

Japanese Patent Laid-Open Publication No. HEI 10-14217 discloses a technology for a PFM (frequency lowering) control in a low load state (the amount of the load is detected). However, the related art does not describe an ON pulse width, an AC input voltage, and so forth necessary for the PFM control.

Next, with reference to FIG. 3 and FIG. 4, a problem with respect to such a control will be described.

FIG. 3 shows the relation of waveforms of a detection signal (the voltage at the FB terminal) of a load power that is output from the photo coupler 18 and the collector voltage and the base voltage of the switching device Q1 at timing of which a current that flows in the secondary winding on the load side.

FIG. 3 shows the case that the load apparatus that operates in the state that the maximum load current (for example, 2 A) flows on the secondary side changes into the standby mode. When the load current gradually decreases, the voltage at the FB terminal gradually lowers from a high voltage. As a result, the load apparatus operates in the Min load state.

In the period, the power conversion of the power supply operates at the basic frequency (for example, 100 kHz). The switching apparatus performs a pulse width converting operation (PWM control) of which only the ON period of the switching device is shortened.

As the load current decreases, the voltage at the FB terminal lowers. When the FB voltage value becomes equal to or lower than the level of the frequency variation (VCO) start voltage (in this example, 1 V), the apparatus performs a frequency varying operation for lowering the switching frequency. At that point, the DC voltage V3 of the tertiary winding start lowering. According to an embodiment of the present invention, in the non-load state (standby state), the apparatus stably performs the non-load operation at an oscillation frequency of 1.5 kHz.

Next, with reference to waveforms shown in FIG. 4, the case that the load abruptly varies will be described.

When the apparatus that operates in the maximum operation state (for example, 2 A) is turned off, the load current abruptly decreases. When the apparatus performs the non-load operation of which the load current is zero, the voltage drop against the maximum load current is superimposed with the output voltage (at a point of which the load current becomes zero). As a result, the voltage on the secondary side instantaneously becomes equal to or higher than the control output voltage (Vo). Thus, the apparatus temporarily stops the power conversion. At that point, as shown in FIG. 4, the FB (feedback) voltage that is a signal that controls the power conversion abruptly drops from the H level to the L level. In addition, the FB voltage becomes lower than the level of the output stop voltage. Thus, the power conversion stop (switching frequency stop) takes place.

In other words, at that point, since the oscillation stops, the output (an ON pulse of the switching device Q1) of the power conversion IC becomes the OFF state.

Since the power conversion stops, the voltage (V3) of the tertiary winding gradually lowers. The voltage V3 lowers to an IC operation stop voltage (for example, 9 V) of the controlling circuit 19.

Even if the FB voltage becomes higher than the output stop voltage, when the voltage V3 becomes the IC operation stop voltage, the operation of the IC circuit of the controlling circuit stops.

Thus, the voltage of the controlling IC becomes equal to or lower than the operation stop voltage. As a result, the starting circuit starts the starting operation again.

When the start current flows in the controlling circuit 19 through the Rp resistor shown in FIG. 1 and a predetermined time period elapses, the voltage of the IC circuit of the controlling circuit 19 becomes in the operation range, 16 V according to the embodiment. At that point, the output voltage starts rising. The rectifying voltage V3 of the tertiary winding rises to 16 V or higher as shown in FIG. 4. As a result, the IC starts operating. At that point, the IC circuit starts the power conversions of the secondary winding and the tertiary winding.

Since the controlling circuit 19 that uses the IC circuit has the foregoing operation characteristic, after the IC circuit that composes the controlling circuit 19 stops until the IC circuit starts, when the apparatus on the secondary side is controlled and turned on, the load current abruptly increases as denoted by a dotted line. However, since the controlling circuit 19 stops, it does not transfer the power to the secondary winding and the tertiary winding. As a result, when the power is turned on, the output voltage Vo lowers. After the controlling circuit 19 starts, the output voltage Vo gradually rises. Thus, the apparatus cannot start operating in the period.

When the load apparatus starts operating, if the output voltage of the power supply lowers, a reset error of a system microcomputer of the apparatus on the loading side or the apparatus may unstably operate.

In recent years, the current consumption of apparatus has been decreased. An apparatus that does not almost consume a load current in the standby state has been commercialized. When the output voltage drops, the standby mode changes to the operation stop mode. As a result, a device that stores the operation state of the apparatus will be reset.

When a recording operation is periodically performed by a video camera or the like, after the recording operation is stopped, if the video camera becomes a zero current mode such as a standby mode so as to reduce power consumption, the operation is reset. As a result, the recoding operation cannot be resumed.

An object of the present invention is to provide a switching power supply apparatus that allows an output voltage to be stably supplied against abrupt load variation such as a startup and stop of a load apparatus.

DISCLOSURE OF THE INVENTION

The switching power supply of the present invention is made to solve the foregoing problem.

The switching power supply apparatus, having a rectifying circuit for converting an AC voltage into a DC voltage; a switching device for intermittently turning on and off the DC voltage obtained from the rectifying circuit through a primary winding of a transformer; a secondary winding and a tertiary winding for inducing powers in accordance with the turning on and off operations of the switching device; power converting means for rectifying and smoothening the power that is output from the secondary winding and supplying the rectified and smoothened power to a load circuit on the secondary side; control signal detecting means for driving the power obtained from the tertiary winding with the rectified and smoothened DC voltage and controlling the power supplied from the secondary winding to the load circuit for predetermined voltage and current; and a controlling circuit having an oscillating portion and a PWM modulating portion for controlling an ON period of the switching device in accordance with a control signal detected by the detecting means so that the power supplied on the secondary side becomes a predetermined value, the switching power supply apparatus comprises comparing means for comparing the DC voltage obtained form the tertiary winding with a reference voltage; and a circuit for supplying a control signal of the detecting means to the controlling circuit, wherein the DC voltage of the tertiary winding is designated to equal to or higher than the minimum operation voltage of the controlling circuit, wherein when the load circuit is abruptly turned off, the oscillation stops, and wherein when the DC voltage becomes equal to or lower than the minimum operation voltage, the oscillation stop state of the controlling circuit is cancelled in accordance with a signal that is output from the comparing means.

BEST MODE FOR CARRYING OUT THE INVENTION

Figure 5:
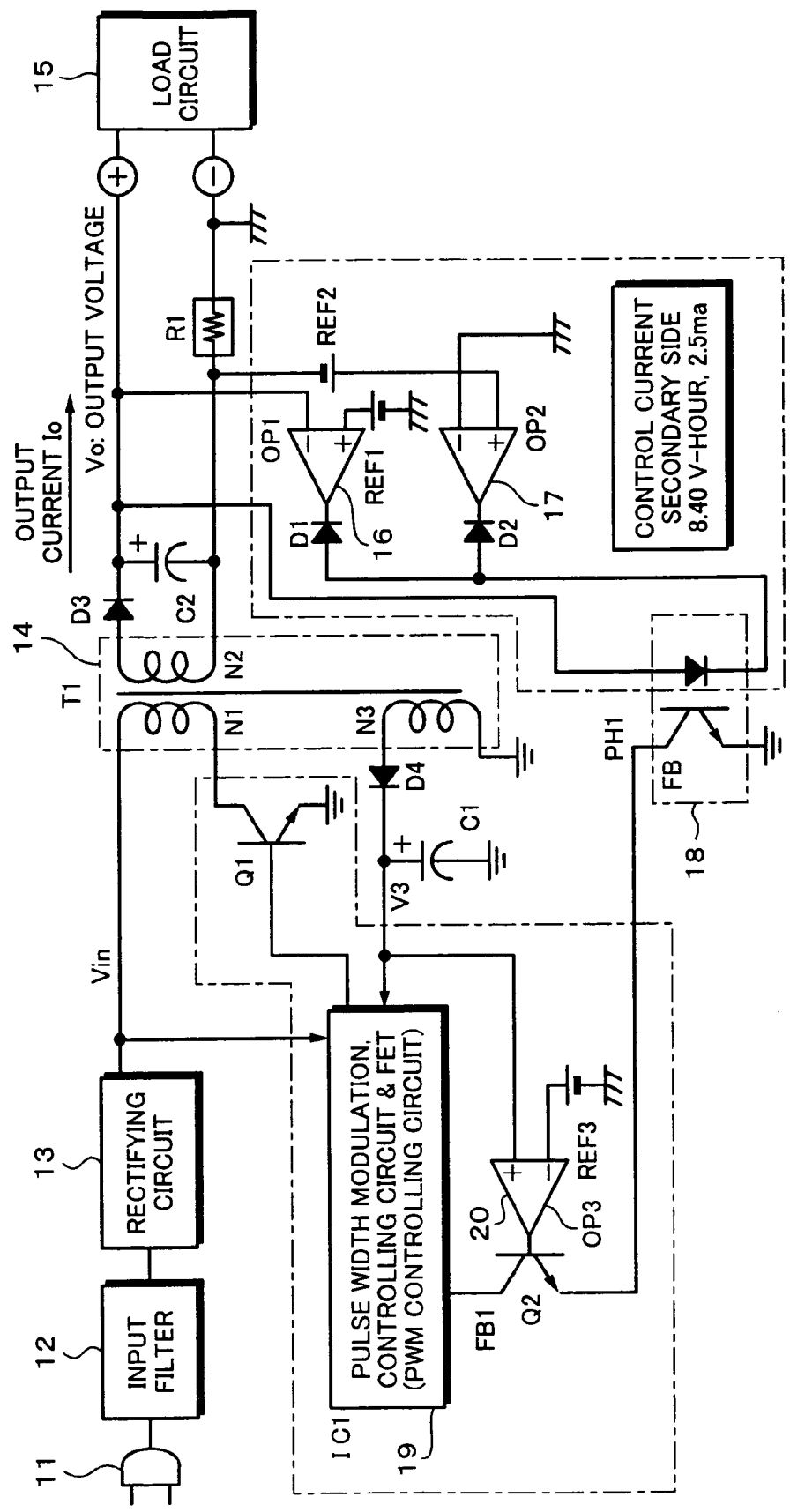
FIG. 5 is a block circuit diagram showing an example of a switching power supply apparatus according to the present invention.

FIG. 5 is a block diagram showing a switching power supply apparatus according to an embodiment of the present invention.

Figure 1:
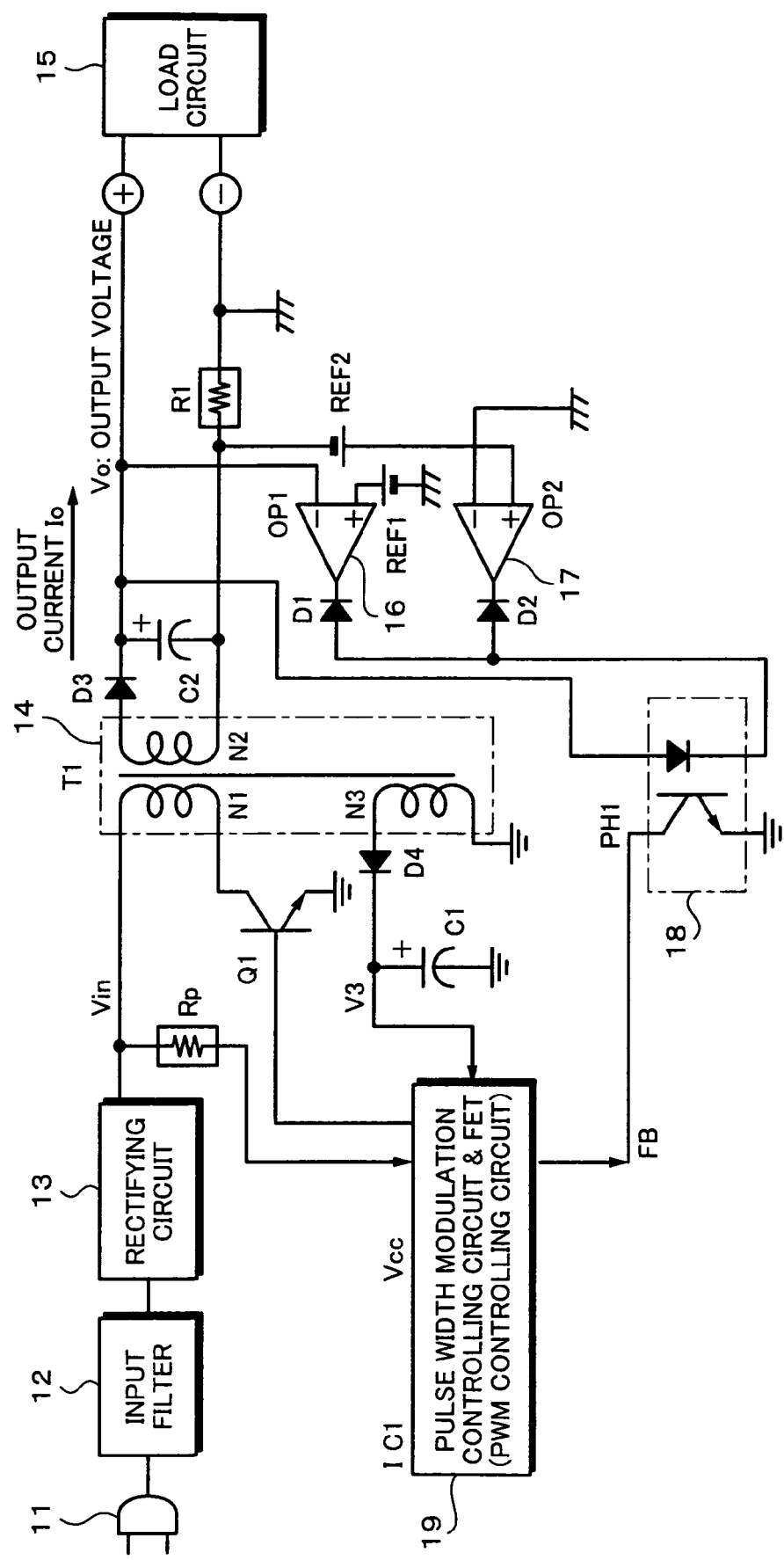
FIG. 1 is a block diagram that is a theoretical diagram of a conventional switching power supply.
Figure 2:
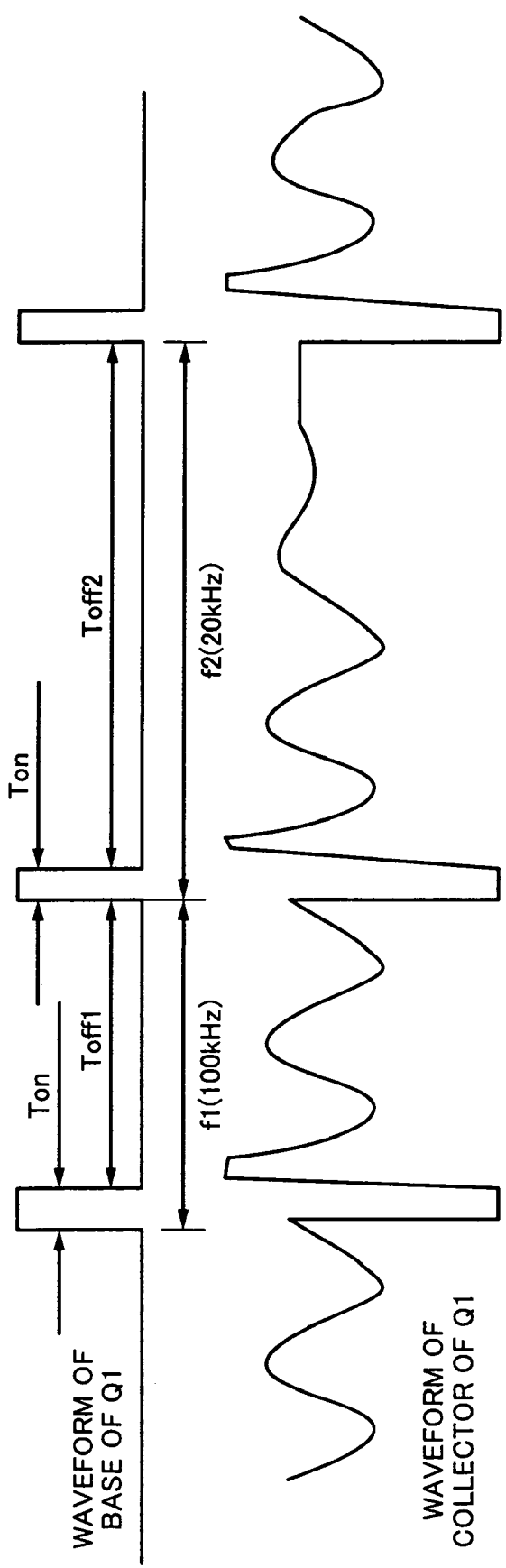
FIG. 2 is a schematic diagram showing drive pulses and an output waveform of a switching device.
Figure 3:
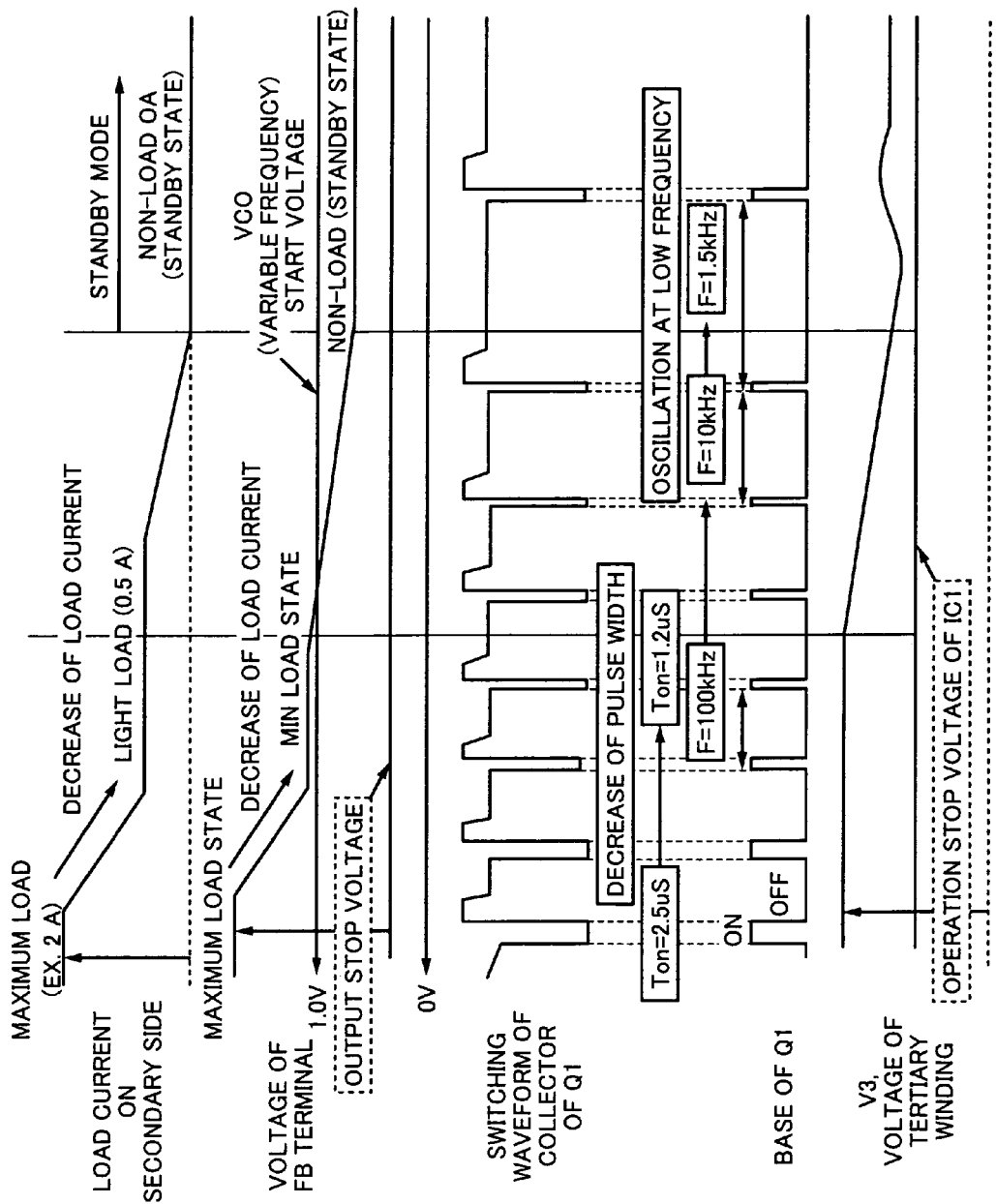
FIG. 3 is a schematic diagram showing the relation of waveforms of a control signal FB and an ON pulse width in the case that the current of the load circuit varies.
Figure 4:
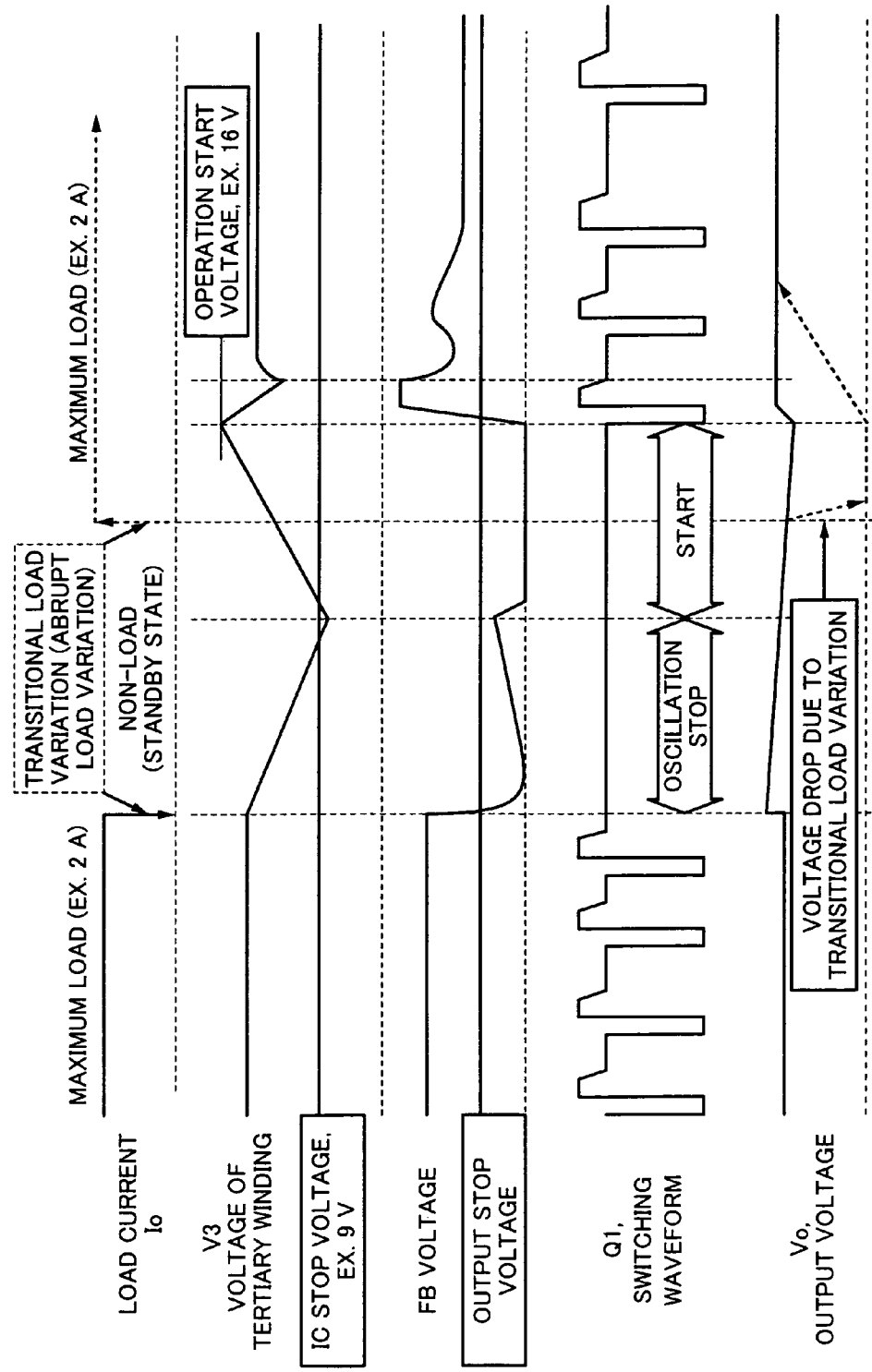
FIG. 4 is a schematic diagram showing waveforms of individual portions in the case that the power of the load circuit is abruptly turned off.

In the drawing, similar portions to those in FIG. 1 are denoted by similar reference numerals and their detailed description will be omitted.

In other words, a commercial AC power is supplied through a connector 11, an input filter 12, and a rectifying circuit 13 and converted into a DC power supply (Vin). A current that flows in a primary winding N1 of a transformer (T1) 14 is controlled by a switching device Q1 at an oscillation frequency of 100 kHz. As a result, powers are induced in a secondary winding (N2) and a tertiary winding (N3) of the transformer (T1) 14.

The voltage induced in the secondary winding (N2) is converted into a DC voltage source Vo by a rectifying circuit of a diode D3 and a capacitor C2. The power is supplied to a load circuit (electronic apparatus) 15 disposed on the next stage.

The output voltage Vo is input to a minus terminal of an operational amplifier (OP1) 16.

On the other hand, a reference voltage REF1 is input to a plus terminal of the operational amplifier (OP1) 16. The operational amplifier (OP1) 16 compares the voltage Vo with the reference voltage REF1 and outputs an error signal of the reference voltage. The error signal is supplied to a photo coupler (PH1) 18 through a diode D1.

The error signal of the voltage is transferred from the secondary side to the primary side by the photo coupler 18. A controlling circuit 19 has a pulse width modulating (PWM) circuit. The PWM circuit controls the ON period of a switching device (Q1) on the primary side of the transformer (T1) 14 so as to control the power on the secondary side thereof.

On the other hand, a resistor R1 detects the current amount of an output current Io that flows in the load circuit 15. The amount of the current that flows in the resistor R1 is converted into a voltage and input to a plus terminal of an operational amplifier (OP2) 17 through a reference voltage REF2. In addition, a minus terminal of the operational amplifier (OP2) 17 is connected to the other terminal of the resistor R1. The operational amplifier (OP2) 17 compares the current corresponding to the reference voltage REF2 and the current that flows in the resistor R1.

The operational amplifier (OP2) 17 compares the current amount corresponding to the reference voltage REF2 with the amount of the current that flows in the resistor R1 and outputs an error signal. The error signal is input to the photo coupler (PH1) 18 through a diode D2. Like the case that the voltage is controlled, the controlling circuit 19 (ICPWM controlling circuit) on the primary side controls the switching device Q1 with the error signal of the output current so that the amount of the output current (Io) becomes a predetermined current amount.

As described above, the operational amplifier (OP1) 16 controls the output voltage Vo for a predetermined voltage and the operational amplifier (OP2) 17 controls the output current Io for a predetermined current. Along with the photo coupler (PH1) 18, the operational amplifier (OP1) 16 and the operational amplifier (OP2) 17 compose detecting means.

The voltage induced in the tertiary winding (N3) is supplied as an operation voltage source to the controlling circuit 19 (PWM controlling IC circuit) disposed on the primary side of the transformer (T1) 14 through a rectifying circuit of a diode D4 and a rectifying circuit. The voltage is used as a drive signal for the switching device Q1. When the output capacity of the power supply is relatively low, the switching device Q1 can be integrated into the controlling circuit 19.

According to the embodiment, a voltage comparator 20 (OP3) is disposed inside or outside the controlling circuit 19. The voltage comparator 20 (OP3) compares an output voltage V3 of the tertiary winding with a reference voltage REF3. With an output of the voltage comparator 20 (OP3), a transistor Q2 is controlled. An FB voltage is applied to an IC circuit that composes the controlling circuit 19 through the transistor Q2.

Next, the operation in the non-load state of which the output current Io does not flow in the load circuit 15 will be described.

As described above, when the load current flows, the controlling circuit 19 (PWM controlling circuit) as an IC circuit supplies a pulse signal oscillated at a predetermined basic oscillation frequency (for example, 100 kHz) and PWM controlled. On the other hand, in the non-load state, the oscillation frequency is lowered with a constant pulse width.

Thus, the operational amplifier (OP1) 16 controls the output voltage Vo for a predetermined voltage. The operational amplifier (OP2) 17 controls the output current Io for a predetermined current.

The voltage induced in the tertiary winding (N3) is used for an operation voltage source of the PWM controlling IC (controlling circuit 19) on the primary side and a driving voltage for the switching device Q1 through the rectifying circuit of the diode D4 and the smoothening capacitor C1.

According to the embodiment of the present invention, the voltage V3 of the tertiary winding is input to a plus terminal of the voltage comparator 20 (OP3). A minus terminal of the voltage comparator 20 (OP3) is connected to a reference voltage source REF3 so as to detect the V3 voltage.

When the rectified voltage V3 of the tertiary winding is higher than the reference voltage source REF3, the output of the voltage comparator 20 (OP3) becomes the high level that causes the transistor Q2 to be turned on.

A collector of the transistor Q2 is connected to the controlling IC circuit 19. An emitter of the transistor Q2 is connected to a collector of a transistor of the photo coupler 18 on the primary side of the transformer (T1) 14.

In other words, when the voltage comparator 20 represents that the voltage V3 of the tertiary winding is equal to or higher than a predetermined reference voltage, the controlling IC circuit 19 turns on the transistor Q2 and turns on the photo coupler 18 so that it passes a power control signal through the photo coupler (PH1) 18. When the voltage comparator 20 represents that the rectifying voltage V3 of the tertiary winding is the reference voltage REF3 or lower, the controlling IC circuit 19 turns off the transistor Q2 that has been turned on so that it does not pass the power control signal through the photo coupler 18.

As will be described later, the FB1 signal supplied to the controlling circuit 19 causes it to perform a pulse width controlling operation. When the load current is the maximum load, the voltage at the FB terminal becomes 1 V or higher in the example. As a result, output pulses to (the base of) the switching device Q1 driven by the controlling circuit 19 become the widest. As the voltage at the FB terminal lowers, the ON period of the switching device Q1 time becomes short.

In addition, in the example, when the voltage at the FB terminal becomes 1 V (voltage at which the frequency starts varying) or less, the controlling circuit 19 gradually lowers the switching frequency with an ON pulse signal having the minimum pulse width is for example 0.5 μs. As the frequency lowers, the controlling circuit 19 gradually increases the minimum pulse width so as to control the ON period of the switching device Q1 with a signal having a pulse width of a maximum of 1.3 μs.

With the voltage at the FB terminal of the controlling circuit 19, in the load state, the controlling circuit 19 performs the switching operation at a basic oscillation frequency. When the voltage at the FB terminal becomes equal to or lower than the voltage at which the frequency starts varying, the oscillation frequency lowers. As the voltage at the FB terminal lowers, the controlling circuit 19 further lowers the oscillation frequency.

Thus, according to the present invention, the control signal for the FB terminal is composed of the voltage and current (the output of the photo coupler) on the secondary side connected to the load circuit and the control signal of the transistor Q2 of which the voltage V3 of the tertiary winding supplied to the controlling circuit 19 is compared with the predetermined reference voltage (REF3).

Figure 6:
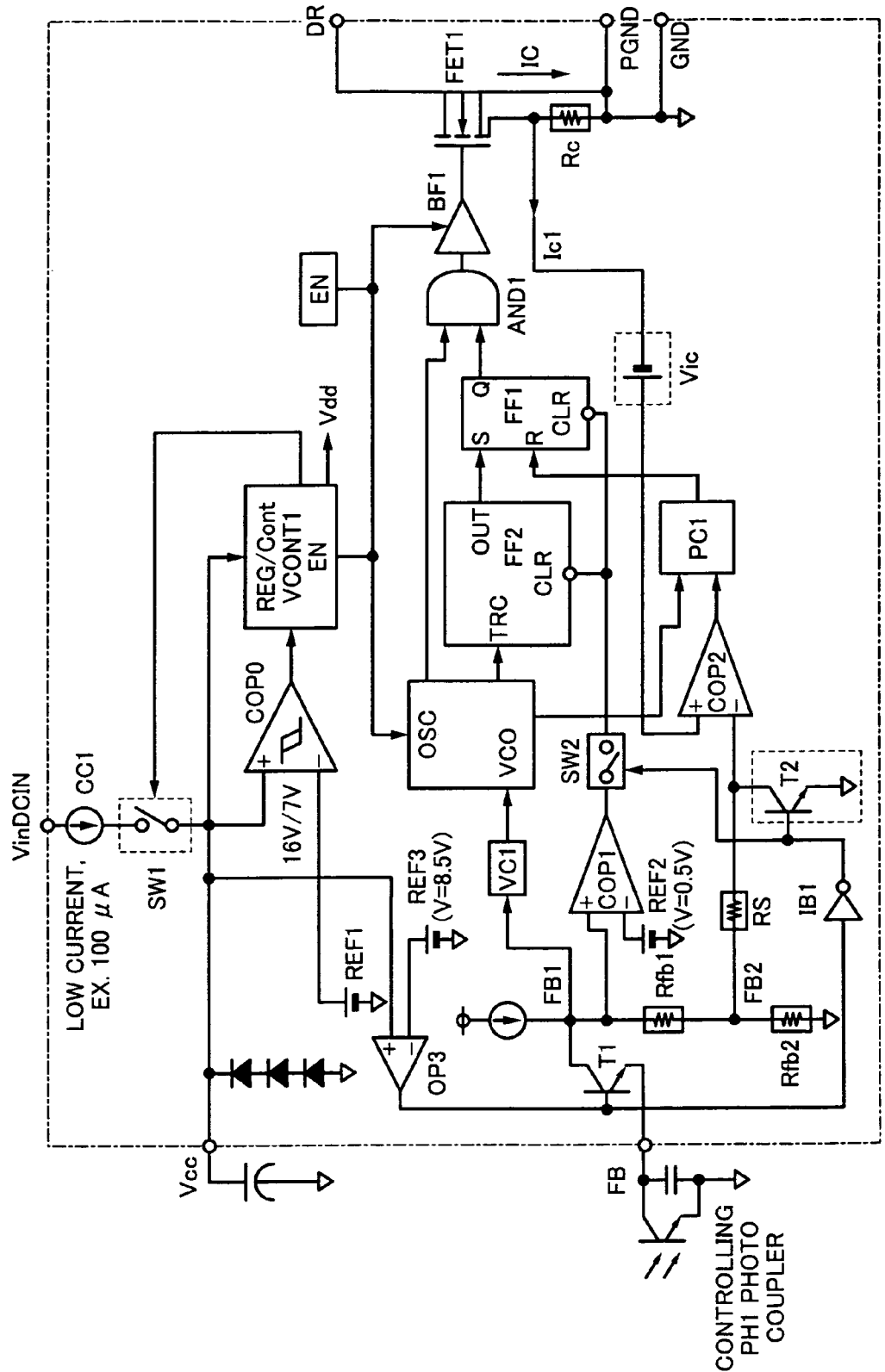
FIG. 6 is a block circuit diagram showing an example of the position of a switching device drive controlling circuit (IC).

FIG. 6 is a block diagram showing an example of an IC block having a function (denoted by a dotted line shown in FIG. 5) of the controlling circuit 19 on the primary side.

Figure 7:
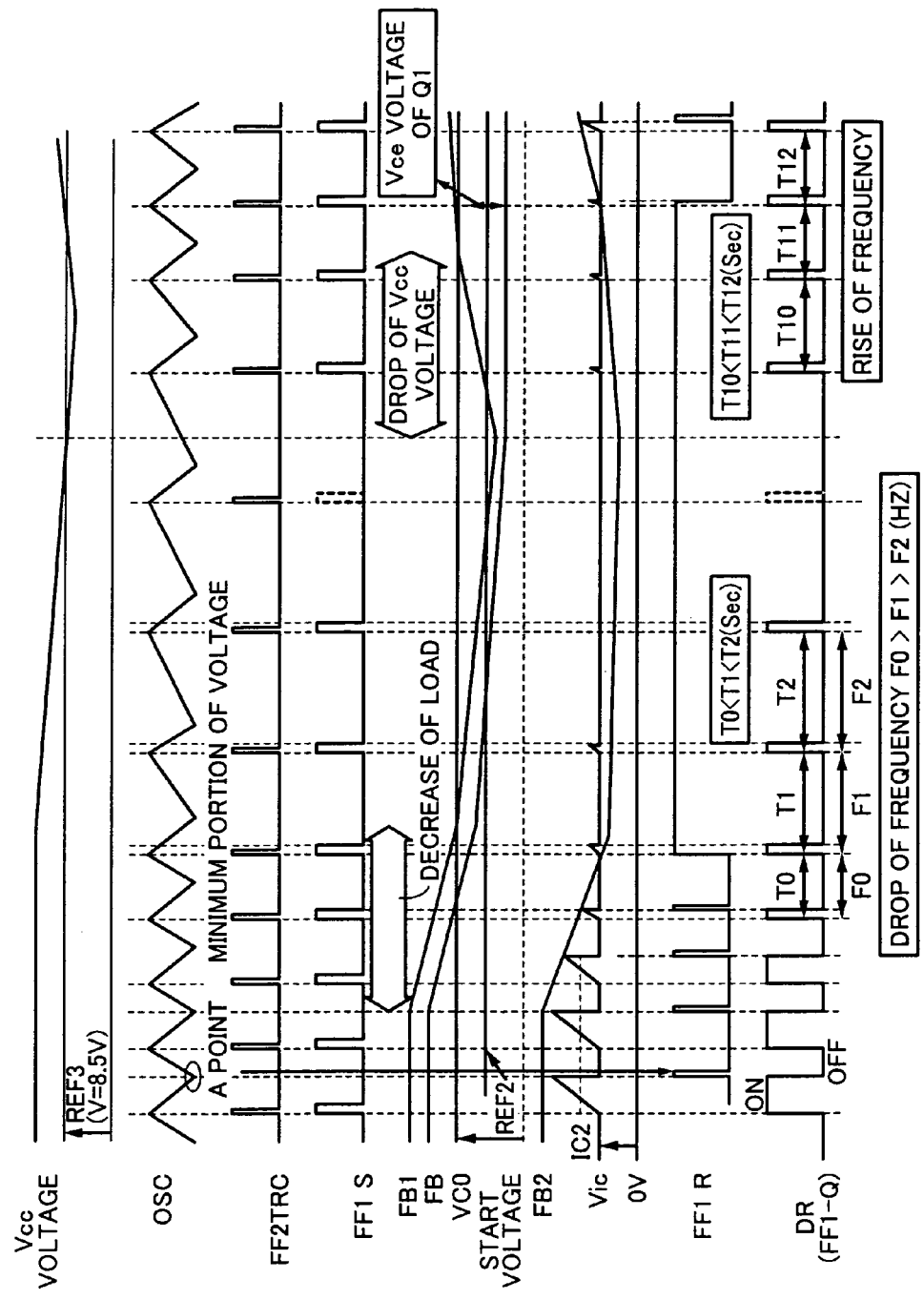
FIG. 7 is a schematic diagram showing waveforms of individual portions of FIG. 6.

FIG. 7 shows a timing chart of the operation of the controlling IC circuit shown in FIG. 6.

In the circuit shown in FIG. 6, when the controlling circuit 19 starts operating, a SW1 is turned on and a DC input voltage Vin of which the AC power supply shown in FIG. 5 is rectified is supplied as a constant current of for example 100 μA to a Vcc (terminal) line of the IC circuit by a constant current circuit CC1.

A comparator COP0 that has a hysterisis monitors the Vcc line. When the voltage of the Vcc line becomes 16 V, a signal is input to a VCONT1 of a voltage monitor controlling circuit. The output signal causes the VCONT1 to operate major circuits such as an oscillating circuit OSC, a flip-flop circuit FF2, an output buffer circuit BF1, and so forth.

When the oscillating circuit OSC operates, it starts oscillating a triangular wave as shown in FIG. 7. A pulse signal that is an upper portion of the triangular wave is input as a trigger pulse TRC to the flip-flop circuit FF2. When the trigger pulse TRC is input to the flip-flop circuit FF2, it inputs a set pulse S for a flip-flop circuit FF1 disposed on the next stage to an S terminal thereof.

On the other hand, the output signal of the photo coupler (PH1) 18 shown in FIG. 5 is supplied to an FB (feedback) terminal of the IC circuit through a transistor T1. A control signal for the load circuit on the secondary side is input to the FB terminal of the IC circuit.

When the output power on the secondary side is increased, the photo coupler PH1 reaches the OFF state. As a result, the voltage at the FB terminal rises. In contrast, when the output power on the secondary side decreases, the photo coupler PH1 approaches the ON state and the voltage at the FB terminal lowers. That state is represented with an FB signal shown in FIG. 7.

The transistor Q2 shown in FIG. 5 is connected as the transistor T1 to the FB terminal. A voltage comparator 20 that detects the voltage Vcc shown in FIG. 5 is connected as an operational amplifier OP3. The operational amplifier OP3 controls Vce (conduction voltage) of the transistor T1.

The plus terminal of the operational amplifier OP3 is connected to a terminal for the rectified voltage V3 of the tertiary winding. The reference voltage REF3 (for example, 8.5 V as minimum operation voltage) is input to the minus terminal of the operational amplifier OP3. As a result, the operational amplifier OP3 compares the reference voltage REF3 with the voltage Vcc. When the relation of Vcc>REF3 (8.5 V) is satisfied, the output of the operational amplifier OP3 becomes the high level so that the transistor T1 is turned on. In this condition, the signal of the photo coupler PH1 connected to the FB terminal becomes enabled. As a result, the control signal supplied from the secondary side causes the IC circuit to operate.

On the other hand, when the relation of Vcc<REF3 (8.5 V) of the operational amplifier OP3 is satisfied, the level of the output of the operational amplifier OP3 varies from the H level to the L level in accordance with the potential between Vcc and REF3. As a result, the state of the transistor T1 varies from the ON state to the OFF state in accordance with the potential. (The voltage Vce rises.)

Timing of which the waveform of the signal varies due to the operation is denoted as an FB1 signal shown in FIG. 7. In the load state, when both the signal levels of the FB1 and FB signals are high, the load current decreases. As a result, the voltage at the FB terminal lowers.

When the voltage Vcc becomes equal to or lower than REF3 (8.5 V), the voltage at the FB terminal remains in the L level in accordance with the potential. However, the Vce voltage of the transistor T1 rises at the FB1 terminal.

Thus, the IC circuit operates as if the load current increased.

The potential between the FB signal and the FB1 signal is a voltage between a collector and an emitter of the transistor T1. As the Vcc voltage that causes the IC circuit to operate lowers, the Vcc voltage rises. It represents that the transistor T1 is turned off.

As described above, the FB1 signal is input to a circuit VC1 that varies the frequency. When the voltage becomes equal to or lower than a predetermined level, the output of the circuit VC1 is input to a VCO terminal of an oscillating circuit OSC. The oscillating circuit OSC starts varying the frequency.

In other words, when the voltage of the FB1 signal lowers as shown in a timing chart of FIG. 7, the VC1 circuit compares the FB1 signal with the VCO start voltage. When the voltage of the FB1 signal is equal to or lower than the VCO start voltage, the start time of the oscillating circuit OSC becomes long. As a result, the IC circuit lowers the frequency.

The FB1 signal that is output from the transistor T1 is input to a plus terminal of a comparator COP1. The comparator COP1 compares the voltage of the FB1 signal with a reference voltage REF2 (for example, 0.5 V) that is input from a minus terminal thereof.

When the FB1 voltage becomes equal to or lower than the REF2 voltage, the output of the COP1 becomes the low level. The flip-flop circuits FF1 and FF2 become the clear state through a SW2. As a result, an FET1 that is the switching device Q1 shown in FIG. 5 is turned off.

A pulse signal portion of an FF1-S signal denoted by a dotted line shown in FIG. 7 is a portion that is turned off.

In addition, the FB1 signal is divided by resisters Rfb1 and Rfb2. A divided point voltage signal is FB2. The divided point voltage signal is input to a minus terminal of the comparator COP2 through an Rs signal. A switching current Ic that flows in the FET1 that composes a switching device is detected by a resistor Rc and the voltage is shifted by a Vic voltage source. The voltage-shifted signal is input to a plus terminal of the comparator COP2. The comparator COP2 compares the signal of the switching current Ic with the FB2 voltage. The compared result is input to a PC1 logic circuit.

The PC1 logic circuit performs a logic process for the signal of the comparator COP2 and a signal (A point pulse signal) of the oscillating circuit OSC and outputs an R signal for the flip-flop circuit FF1 as shown in FIG. 7. The R signal is input to an R (reset terminal) of the FF1.

Thus, when the FET1 that is a switching device is turned on, as shown in FIG. 7, the S signal of the flip-flop circuit FF1 is input. Since a Q output of the flip-flop circuit FF1 varies from the L level to the H level, the switching FET1 is controlled in the ON pulse period.

The flip-flop circuit FF2 trims a waveform so as to designate the minimum ON period for the flip-flop circuit FET1. The S signal is input to the S terminal of the flip-flop circuit FF1. When the S signal is input to the flip-flop circuit FF1, it outputs a H level signal from a Q output thereof. The H level signal is input to a gate of the switching FET1 through an AND1 logic circuit and a buffer circuit BF1.

As a result, since the switching FET1 is turned on, a switching current flows. When the switching current flows, the resistor Rc detects the switching current. The signal is superimposed with the Vic voltage. As a result, the COP2 compares the FB2 signal with the IC2 signal (see FIG. 7).

An output signal of the comparator COP2 is input to an a reset R terminal of the flip-flop circuit FF1 through a PC1 logic circuit. The Q output of the flip-flop circuit FF1 is reset with an R pulse. The Q output of the flip-flop circuit FF1 varies from the H level to the L level. When the Q output of the flip-flop circuit FF1 becomes the L level, the switching FET1 is turned off.

As described above, the FB1 signal causes the operational amplifier OP1 to detect the Vcc voltage so as to control the output of the transistor T1. An output of the operational amplifier OP1 controls the transistor T1. In addition, the output of the operational amplifier OP1 also controls a switch circuit SW2 connected to an output terminal of an inverting circuit IB1.

When the Vcc voltage becomes equal to or lower than REF3 (for example, 8.5 V), the SW2 circuit is opened so that the flip-flop circuit is not cleared. As a result, even if the voltage at the FB1 terminal becomes equal to or lower than the reference voltage REF2 (0.5 V), the function for causing the output of the FET1, which is a switching device, to be in the OFF state is disabled.

The polarity of the output of the operational amplifier OP1 is inverted by the inverting circuit IB1. The output of the operational amplifier OP1 is also connected to a base terminal of a transistor T2 of the circuit shown in FIG. 6. When the Vcc voltage becomes equal to or lower than the reference voltage REF3 (8.5 V), the output of the operational amplifier OP1 causes the transistor T2 to be turned on, the minus terminal of the comparator COP2 to be placed in the L level, and the output of the comparator COP2 to be placed in the H level (See FIG. 7.)

In this example, the flip-flop circuit FF1 is a logic circuit that causes a signal to be output to a Q terminal while a reset signal S is input even if a reset signal is input.

Thus, when the transistor T2 is turned on, the switching device FET1 can be placed in an ON pulse control mode of which the ON period of the S signal of the flip-flop circuit FF1 is the minimum.

When the function of the transistor T2 is not provided (T2 is fixed in the OFF state), a pulse width control of which the ON width of the switching FET1 is controlled in the ON period corresponding to the FB2 signal can be accomplished (this portion is set forth in claim 2).

Figure 8:
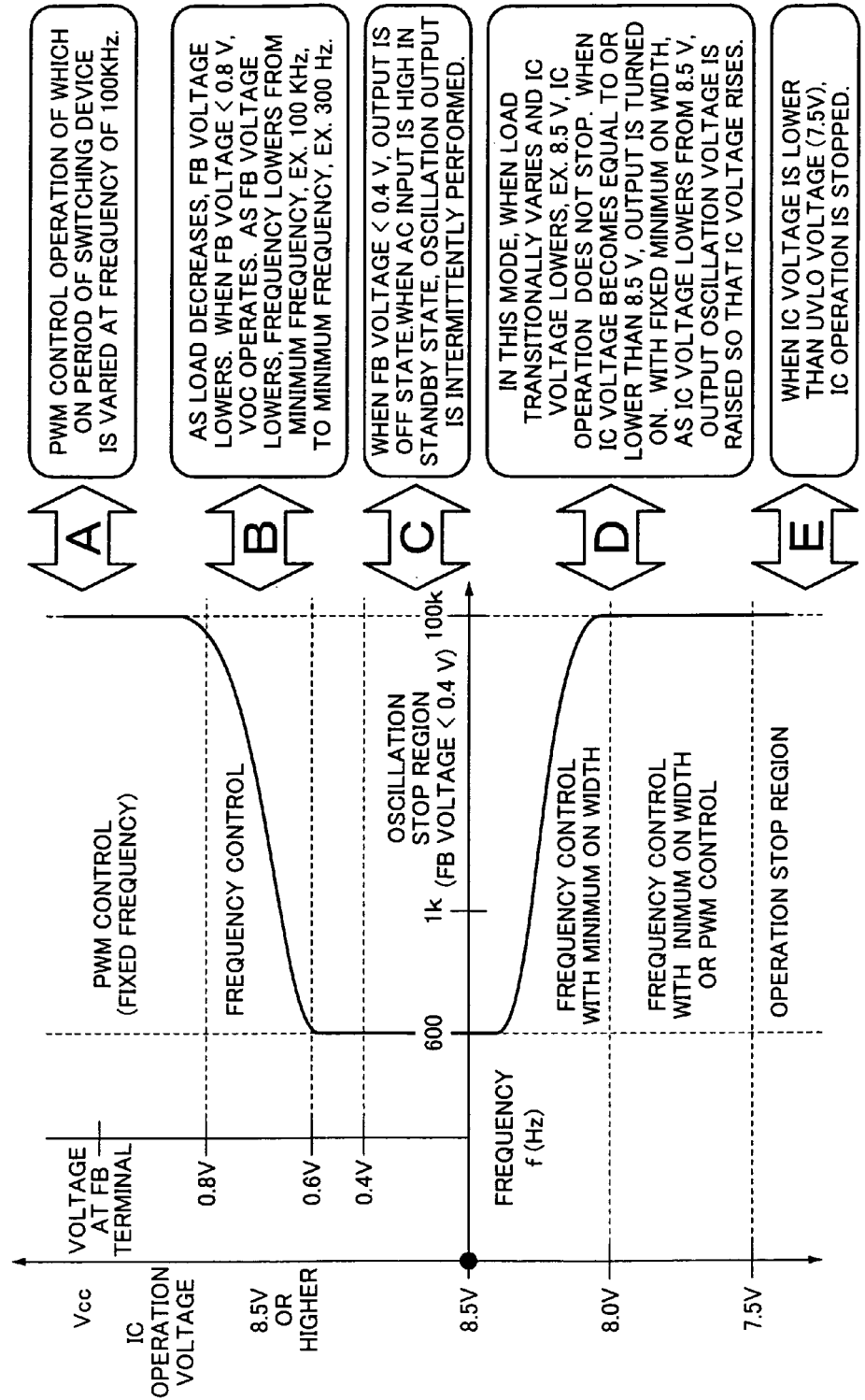
FIG. 8 is a graph showing the relation of a Vcc voltage, an oscillation frequency, and a voltage at an FB terminal.

FIG. 8 shows the operation of the embodiment of the present invention.

In the drawing, the horizontal axis represents variation of a switching frequency, whereas the vertical axis represents the operation voltage of the IC circuit and the voltage at the FB terminal. Next, with reference to the drawing, a method for controlling the frequency with the Vcc and FB voltages will be described.

An arrow A represents that a load current flows. The voltage at the FB terminal is for example 0.8 V or higher. In the example, the switching ON time width at a frequency of 100 kHz is controlled in the PWM control mode.

The minimum ON pulse width in the PWM control mode is for example 0.5 µs.

In the region of an arrow B, when the load current decreases and the voltage at the FB terminal becomes equal to or lower than a frequency control voltage, in this example, 0.8 V or lower, the frequency control mode takes place in the minimum ON period. As the voltage at the FB terminal lowers, the frequency lowers. In this case, when the frequency lowers as the voltage at the FB terminal lowers (0.8 V or lower), the minimum ON pulse width is gradually increased from 0.5 µs. In this example, when the voltage at the FB terminal is 0.6 V, the minimum ON pulse width is increased until 1.3 µs at the minimum frequency (for example, 600 Hz).

In addition, the minimum ON pulse width is further controlled with the AC input voltage (Vin).

In the non-load state, when the AC input voltage is high (AC 240 V), namely the input DC voltage (Vin) of which the AC current is rectified is high, the minimum pulse width is for example 0.3 µs. In contrast, when the AC input voltage is low (AC 100 V), if the input DC voltage is low, the minimum pulse width is for example 1.3 µs. In such a manner, the minimum pulse width is varied in accordance with the input DC voltage.

Thus, the oscillation frequency in the non-load operation state is optimized in accordance with the input voltage. (This portion is set forth in claim 3).

In the region of an arrow C, the minimum frequency is 600 Hz. The voltage at the FB terminal lowers. When the voltage at the FB terminal becomes the oscillation stop designation voltage, in this example, 0.4 V or lower, the switching device is in the OFF state (oscillation stop region).

In the normal operation, the Vcc voltage is controlled as an operation point that exceeds 8.5 V. When the load transitionally varies and the output current instantaneously becomes zero, the oscillation stops. Thus, the Vcc voltage lowers.

The drop of the Vcc voltage is detected by the operational amplifier OP1. When the Vcc control voltage (in this example, 8.5 V or lower) is designated and the Vcc control voltage becomes lower than the designated voltage, the oscillation stop state is cancelled as a region denoted by an arrow D. The switching device is operated in the frequency control mode. In this case, since the Vcc voltage lowers, the Vce voltage of the transistor T1 rises. As a result, the oscillation frequency is gradually raised from the minimum frequency to the basic frequency (100 kHz).

In this case, when the frequency is raised from the minimum frequency to the basic frequency, the ON pulse width of the switching device is decreased from for example 1.3 µs as the minimum ON pulse width. When the frequency is raised to the basic frequency, the ON pulse width becomes for example 0.5 µs.

According to the embodiment, the ON pulse width can be fixed to 0.5 µs.

In the example, with the transistor T2 shown in FIG. 6, when the Vcc voltage is restored to 8.0 V, the oscillation frequency is raised to the basic frequency, 100 kHz. On the other hand, when the voltage at the FB terminal lowers, while the minimum ON period is fixed (in this example, 0.5 µs), the apparatus operates at the basic frequency.

If the transistor T2 is omitted (or fixed to the OFF state), when the frequency rises to the basic frequency and the voltage at the FB terminal lowers, in the PWM control mode, the ON width of the switching device is increased. Thus, two types of the PWM control mode are proposed.

When the Vcc voltage becomes equal to or lower than 7.5 V, the operation of the IC circuit stops as an operation stop voltage UVLO in a region denoted by an arrow E shown in FIG. 8.

Figure 9:
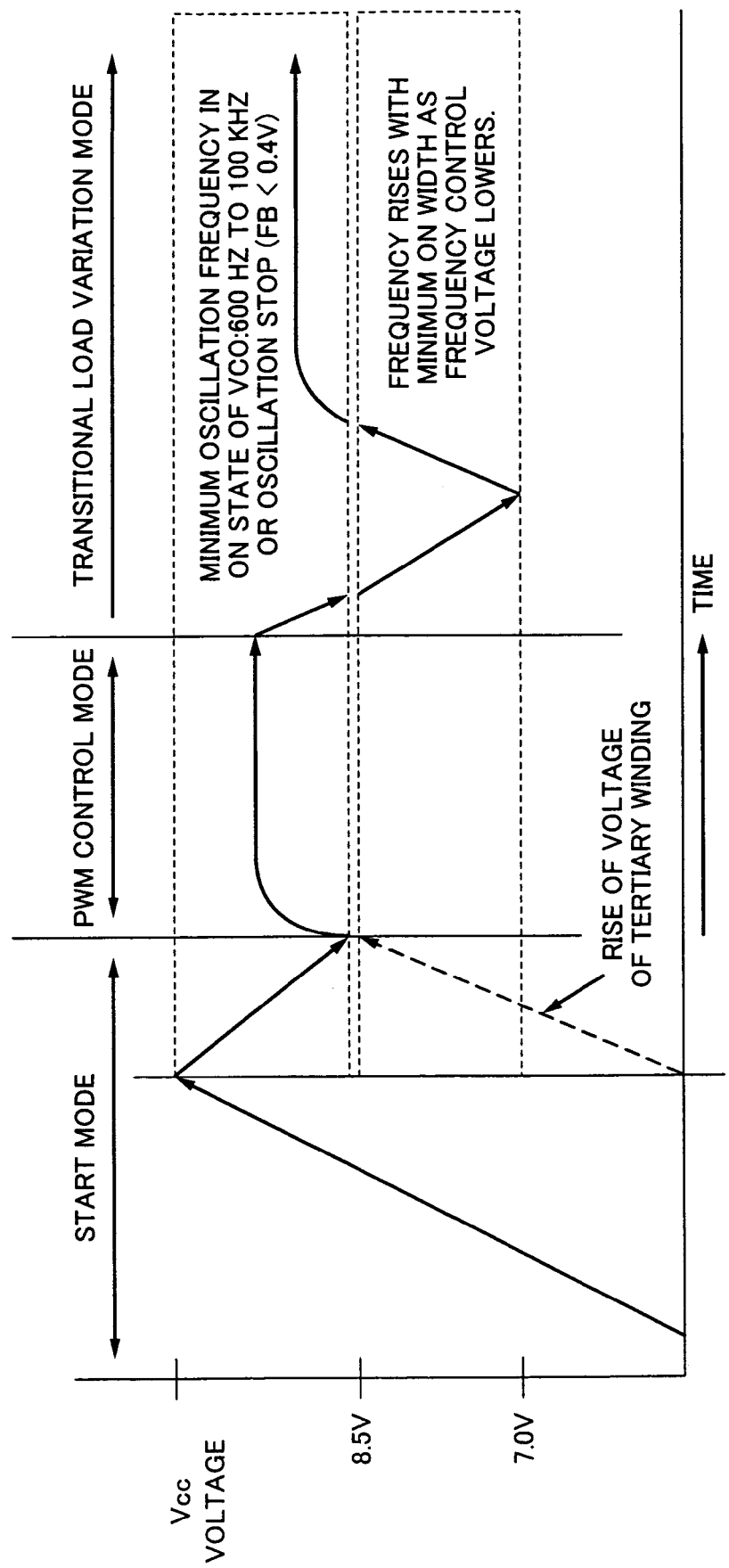
FIG. 9 is a graph showing the relation of the Vcc voltage and start and transitional load variation modes.

FIG. 9 shows the relation of the Vcc voltage and start mode and transitional load variation mode.

Figure 10:
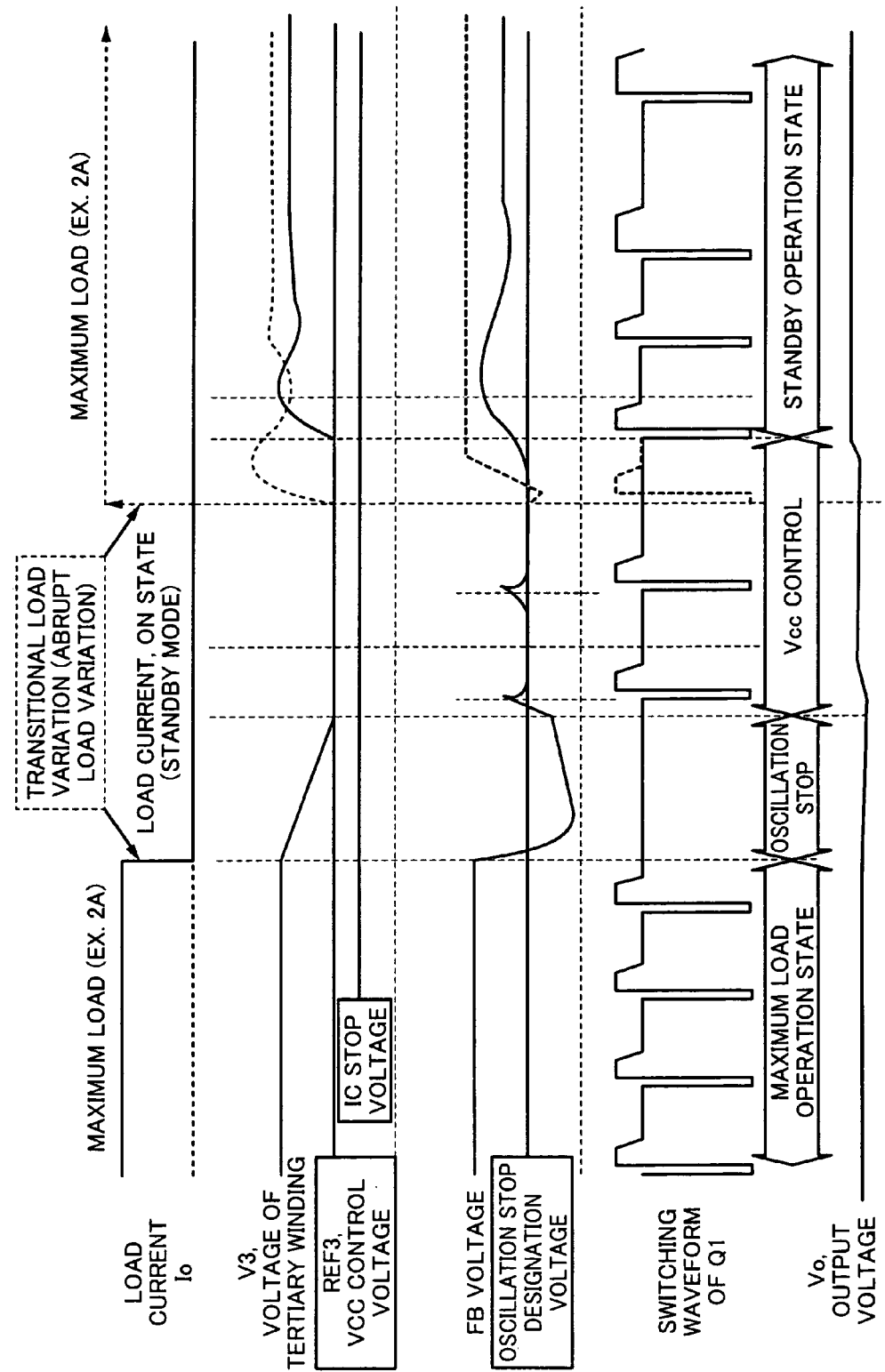
FIG. 10 is a schematic diagram showing the relation of voltages and waveforms of signals of individual portions in the transitional load variation state.

FIG. 10 shows timing of the detail operation in the transitional load variation mode.

In the start mode of which the switching power supply starts, when the SW1 shown in FIG. 6 is turned on, the Vcc voltage of the IC circuit gradually rises. When the voltage becomes 16 V, the controlling circuit 19 becomes the drive state. The controlling circuit 19 starts the switching operation. As a result, a voltage is induced in the tertiary winding. When the voltage rises to the PWM mode start voltage, the Vcc voltage becomes stable.

At that point, the basic oscillation frequency is for example 100 kHz. As a result, the PWM control mode takes place. In the PWM control mode, the drive pulses are PWM modulated depending on the load state.

As described above, when the power of the load apparatus is abruptly turned off, the transitional load variation mode takes place. In the transitional load variation mode, the Vcc voltage lowers and the oscillation stops. However, as described above, according to the present invention, the oscillation continues at a frequency of for example 600 Hz or higher. The frequency is raised with the minimum ON width. When the frequency is raised, the voltage of the tertiary winding rises. When the Vcc voltage becomes equal to or higher than 8.5 V, the IC circuit can stably continue the operation (without a voltage drop of the IC operation stop voltage).

Such an operation will be described with a load current (Io), a voltage V3 of the tertiary winding, an IC circuit stop voltage level, an FB voltage, an oscillation stop designation level, an output waveform of a switching device, and a waveform of an output voltage Vo on the secondary side shown in FIG. 10.

When the load transitionally varies (power off) takes place in the load apparatus that operates in the maximum load state, the FB voltage abruptly varies from the H level to the L level. At that point, the FB voltage becomes equal to or lower than the oscillation stop voltage. As a result, the oscillation stops. At that point, since the rectified voltage V3 of the tertiary winding lowers with a time constant, the Vcc control voltage (in this example, 8.5 V shown in FIG. 8) gradually lowers.

Thereafter, the Vcc voltage becomes the Vcc control voltage (equal to or lower than REF3 shown in FIG. 8). As a result, the Vcc control mode takes place. Thereafter, the IC circuit cancels the oscillation stop state and starts operating.

In such a manner, the oscillation is restored. The oscillation frequency is controlled (VCO control) so that the Vcc voltage does not become equal to or lower than the Vcc control voltage. As a result, the switching device is turned on.

When the output voltage on the secondary side stably becomes the non-load control voltage, the voltage at the FB terminal rises from the L level to the H level. The voltage further rises and becomes equal to or higher than the oscillation stop voltage. In addition, the Vcc voltage further rises. Finally, the IC circuit stably operates in the standby state. As a result, when the transitional load varies, the Vcc voltage drop is prevented from lowering.

According to the present invention, at timing denoted by a dotted line shown in FIG. 10, even in the Vcc control mode, when the power of the load apparatus is turned on, the load current flows. Even if the FB voltage abruptly rises, after the frequency is raised, the PWM control can be smoothly performed. As a result, the PWM control can be performed in accordance with the load. Thus, the problem of the related art can be solved.

As described above, while the PWM controlling type switching power supply apparatus is operating, if the load transitionally varies from a state that a load current flows to a state that the load apparatus abruptly stops, the switching power supply apparatus stops the switching operation. Until the voltage (FB signal) on the secondary side becomes stable, the apparatus may continue the stop state. In this case, the voltage of the tertiary winding of the power supply voltage source of the controlling circuit (IC) on the primary side lowers and the IC operation of the controlling circuit stops. The controlling circuit (IC) restarts. In contrast, according to the present invention, when the oscillation stops, the controlling circuit detects the supplied operation voltage and automatically starts the switching operation. Thus, the restoration of the operation state due to the start resistor that results in a time lag can be prevented.

As a result, when the IC operation of the controlling circuit stops or starts, even if the load apparatus starts operating, the output voltage on the secondary side can be prevented from lowering. In addition, the voltage of the power supply of the IC circuit of the controlling circuit on the primary side can be stabilized.

When the electronic apparatus is connected as a load apparatus, if the output voltage on the secondary side lowers, a reset error of a system microcomputer of the load apparatus or an unstable operation of the load apparatus may take place. However, according to the present invention, such a load apparatus can be prevented from malfunctioning.

In recent years, the current consumption of apparatus has been decreased. An apparatus that does not almost consume a load current in the standby state has been commercialized. When the output voltage drops, the standby mode changes to the operation stop mode. As a result, a device that stores the operation state of the apparatus will be reset. When a recording operation is periodically performed by a video camera or the like, after the recording operation is stopped, if the video camera becomes a zero current mode such as a standby mode so as to reduce power consumption, the operation is reset. As a result, the recoding operation cannot be resumed. However, when the switching power supply apparatus according to the present invention is mounted, such a problem can be solved.

DESCRIPTION OF REFERENCE NUMERALS

11 OUTLET
12 INPUT FILTER
13 RECTIFYING CIRCUIT
14 TRANSFORMER
15 LOAD CIRCUIT
16, 17 OPERATIONAL AMPLIFIER
18 PHOTO COUPLER
19 CONTROLLING CIRCUIT
20 COMPARATOR

The invention claimed is:

1. A switching power supply apparatus, having:
   a rectifying circuit for converting an AC voltage into a DC voltage;
   a switching device for intermittently turning on and off the DC voltage obtained from the rectifying circuit through a primary winding of a transformer;
   a secondary winding and a tertiary winding for inducing powers in accordance with the turning on and off operations of the switching device;
   power converting means for rectifying and smoothing the power that is output from the secondary winding and supplying the rectified and smoothing power to a load circuit on the secondary side;
   control signal detecting means for driving the power obtained from the tertiary winding with the rectified and smoothened DC voltage and controlling the power supplied from the secondary winding to the load circuit for predetermined voltage and current; and
   a controlling circuit having an oscillating portion and a PWM modulating portion for controlling an ON period of the switching device in accordance with a control signal detected by the detecting means so that the power supplied on the secondary side becomes a predetermined value, the switching power supply apparatus comprises:
   comparing means for comparing the DC voltage obtained from the tertiary winding with a reference voltage; and
   a circuit for supplying a control signal of the detecting means to the controlling circuit,
   wherein the DC voltage of the tertiary winding is designated to equal to or higher than the minimum operation voltage of the controlling circuit,
   wherein when the load circuit is abruptly turned off, the oscillation stops, and
   wherein when the DC voltage becomes equal to or lower than the minimum operation voltage, the oscillation stop state of the controlling circuit is cancelled in accordance with a signal that is output from the comparing means.

2. The switching power supply apparatus as set forth in claim 1,
   wherein a pulse width control is performed so that when the load circuit is in a standby state and the switching device oscillates at a low frequency lower than a basic frequency, if the voltage supplied to the controlling circuit becomes equal to or lower than the minimum operation voltage, the operation stop state of the controlling circuit is cancelled, the switching frequency is raised from the low frequency corresponding to the voltage lowered from the minimum operation voltage to the basic frequency, and when the switching frequency becomes the basic frequency, the ON period of the switching device is increased.

3. The switching power supply apparatus as set forth in claim 2,
   wherein the pulse width control is configured to cause the ON period of the switching pulses in the standby state of the load circuit so that when the input DC voltage is high, the pulse width decreases and when the DC voltage is low, the pulse width increases.

* * * * *